United States Patent
Zhong et al.

(10) Patent No.: US 10,147,448 B2
(45) Date of Patent: Dec. 4, 2018

(54) HIGH FLOW PACKAGING FOR SLIDER CLEANING

(71) Applicant: Seagate Technology LLC, Cupertino, CA (US)

(72) Inventors: Lijuan Zhong, Eden Prairie, MN (US); Peter Gunderson, Ellsworth, WI (US)

(73) Assignee: Seagate Technology LLC, Cupertino, CA (US)

( * ) Notice: Subject to any disclaimer, the term of this patent is extended or adjusted under 35 U.S.C. 154(b) by 594 days.

(21) Appl. No.: 14/793,260

(22) Filed: Jul. 7, 2015

(65) Prior Publication Data

US 2016/0012835 A1    Jan. 14, 2016

Related U.S. Application Data

(60) Provisional application No. 62/021,771, filed on Jul. 8, 2014.

(51) Int. Cl.
*B08B 3/02* (2006.01)
*G11B 5/41* (2006.01)

(52) U.S. Cl.
CPC . *G11B 5/41* (2013.01); *B08B 3/02* (2013.01)

(58) Field of Classification Search
None
See application file for complete search history.

(56) References Cited

U.S. PATENT DOCUMENTS

| | | |
|---|---|---|
| 6,348,632 B1 | 2/2002 | Han |
| 6,612,442 B2 | 9/2003 | Soh et al. |
| 6,857,524 B2 | 2/2005 | Duban-Hu et al. |
| 6,868,970 B2 | 3/2005 | Gardiner et al. |
| 6,914,771 B2 | 7/2005 | Ono et al. |
| 7,059,476 B2 | 6/2006 | Kunii et al. |
| 7,191,512 B2 | 3/2007 | Girard et al. |
| 7,360,653 B2 | 4/2008 | Blake et al. |
| 9,406,325 B2 * | 8/2016 | Johnson .................. G11B 5/41 |
| 2006/0012360 A1 | 1/2006 | Luo et al. |

FOREIGN PATENT DOCUMENTS

CN            101286323        * 10/2008

* cited by examiner

*Primary Examiner* — Michael E Barr
*Assistant Examiner* — Jason P Riggleman
(74) *Attorney, Agent, or Firm* — Kagan Binder, PLLC

(57) ABSTRACT

A tray system for containing multiple electronic components that includes a first tray having a planar member and a plurality of pockets recessed into an upper surface of the planar member, wherein each of the pockets includes: a bottom surface; an aperture extending through the bottom surface; a supply channel extending from a lower surface of the planar member to the aperture; a plurality of wall segments extending from the bottom surface of the pocket to the upper surface of the planar member and defining a perimeter of the pocket; and a plurality of pedestals extending from the bottom surface of the pocket toward the upper surface of the first tray.

17 Claims, 4 Drawing Sheets

HIGH FLOW PACKAGING FOR SLIDER CLEANING

PRIORITY CLAIM

The present nonprovisional patent Application claims priority under 35 U.S.C. § 119(e) from U.S. Provisional patent application having Ser. No. 62/021,771, filed on Jul. 8, 2014, by Zhong et al. and titled "HIGH FLOW PACKAGING FOR SLIDER CLEANING," wherein the entirety of said provisional patent application is incorporated herein by reference.

BACKGROUND

Hard disk drive systems (HDDs) typically include one or more data storage disks and a magnetic transducing head carried by a slider to read from and write to a data track on a disk. The slider is carried by an arm assembly that includes an actuator arm and a suspension assembly, which can include a separate gimbal structure or can integrally form a gimbal. The transducing heads are typically produced by using thin film deposition techniques. In a typical process, an array of sliders are formed on a common substrate or an AlTiC wafer which is then sliced to produce bars, with a row of sliders in a side-by-side pattern on each bar. The bars are then subjected to a series of processes to form individual sliders, including lapping, cleaning, formation of air-bearing surfaces (ABS), and dicing.

Each of the multiple processing steps for forming the magnetic head sliders introduces the possibility for dust, gasified organic matter, or other contaminants to deposit and/or adhere to a surface of the slider. For example, because the lapping process and/or other processes can utilize polishing materials, a portion of these polishing materials may remain on a slider surface after the process is complete. If any of the contaminants remain on the slider surface, they can reduce the reliability of the disk drive performance and thus must be removed prior to installation of the slider in a disk drive. For this reason, magnetic head sliders are often subjected to thorough cleaning in the final manufacturing stage.

Generally, the cleaning process includes multiple steps, including a step of washing off the contaminant adhering to the magnetic head slider with use of a cleaning solution, a step of rinsing off the adhering cleaning solution with rinsing liquid, and a step of drying the rinsing liquid remaining on the slider. During this cleaning, each slider is often secured within a cavity of a tray that holds multiple sliders, wherein the tray may be used as a carrier member to transport the sliders to one or more subsequent processes. The efficiency of the cleaning process is highly dependent on the flow conditions surrounding the slider surfaces within the slider packaging. There is a continued need to provide improved systems that facilitate optimization of the reliability, effectiveness, and speed of slider cleaning processes.

SUMMARY

The present invention is directed to trays having a plurality of cavities for retaining a plurality of magnetic head sliders during a washing/cleaning process. The trays can also be used to store sliders before and after the washing/cleaning process and during transport. In one aspect of the invention, a tray system is provided for containing multiple electronic components, which may have a rectangular perimeter. The tray system includes a first tray having a planar member and a plurality of pockets recessed into an upper surface of the planar member, wherein each of the pockets includes: a bottom surface; an aperture extending through the bottom surface; a plurality of wall segments extending from the bottom surface of the pocket to the upper surface of the planar member and defining a perimeter of the pocket, wherein the wall segments are configured to provide at least three areas of contact with edges of one of the electronic components that is positionable within the pocket; and a plurality of pedestals extending from the bottom surface of the pocket toward the upper surface of the first tray. The tray further includes a supply channel extending from each aperture to a lower surface of the planar member. The tray system may further include a second tray having a lower surface adjacent to an upper surface of the first tray, wherein the second tray includes at least one fluid channel extending through its thickness for fluid communication with one of the pockets of the first tray.

In aspects of the invention, such as the aspect discussed above, each of the pockets can include multiple pedestals extending from the bottom surface of the pocket toward the upper surface of the first tray, wherein a contact surface of each of the multiple pedestals is used to define a planar surface on which an electronic component can be positioned. In a particular embodiment, the pockets include three pedestals. The plurality of wall segments may be configured to provide two adjacent corners at a first side of the pocket and a flat surface at a second side of the pocket that is opposite the first side, wherein the plurality of wall segments can include a portion between each of the corners and the flat surface that provides a concave curve. Each supply channel of the tray system of the invention can be connected to a fluid source that provides pressurized solution for cleaning an electronic component positioned each pocket.

In another aspect of the invention, a tray is provided for containing a plurality of electronic components, wherein the tray includes a planar member and a plurality of pockets recessed into an upper surface of the planar member, wherein each of the pockets includes: a bottom surface; an aperture extending through the bottom surface; a supply channel extending from a lower surface of the planar member to the aperture; a plurality of wall segments extending from the bottom surface of the pocket to the upper surface of the planar member and defining a perimeter of the pocket, wherein the wall segments are configured to provide three areas of contact with one of the electronic components; and a plurality of pedestals extending from the bottom surface of the pocket toward the upper surface of the planar member. In this aspect of the invention, a first and a second of the three areas of contact can include wall segments that meet at a corner, and a third of the three areas of contact can include a linear wall segment.

In another aspect of the invention, a storage and cleaning tray containing a plurality of electronic components is provided, wherein the tray includes a planar member and a plurality of pockets recessed into an upper surface of the planar member. Each of the pockets includes: a bottom surface; an aperture extending through the bottom surface; a supply channel extending from a lower surface of the planar member to the aperture; and a plurality of wall segments extending from the bottom surface of the pocket to the upper surface of the planar member and defining a perimeter of the pocket, wherein the wall segments are configured to provide three areas of contact with one of the electronic components. The tray further includes an electronic component positioned within at least one of the pockets, wherein a bottom surface of the electronic component is spaced from the bottom surface of the pocket. The pockets can each further include a plurality of pedestals extending from the bottom surface of the pocket toward the upper surface of the planar member, and may particularly include three of such pedestals.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
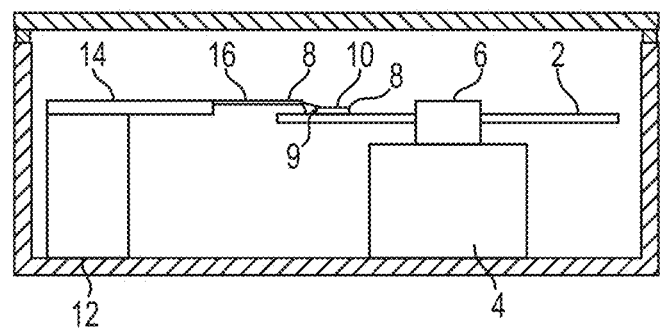
FIG. 1 is a sectional side view of a magnetic recording disk drive.
Figure 2:
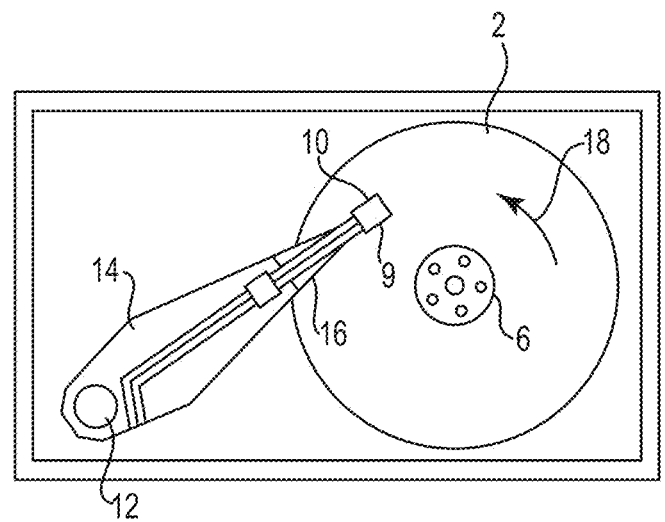
FIG. 2 is a top view of the magnetic recording disk drive of FIG. 1.

Referring now to the Figures, wherein the components are labeled with like numerals throughout the several Figures, and initially to FIGS. 1 and 2, an exemplary configuration of a magnetic recording disk drive is illustrated, which generally includes a magnetic recording disk 2 that is rotated by a hub 6 that is mechanically driven by drive motor 4. A slider with a read/write head or transducer 8 is located on the trailing end or surface 9 of a slider 10. A rigid arm 14 and a suspension element 16 connect the slider 10 to an actuator 12. The suspension element 16 provides a bias force that urges slider 10 toward the surface of disk 2. During operation of the disk drive, drive motor 4 rotates disk 2 at a constant speed in the direction of arrow 18. Actuator 12, which can be a linear or rotary motion coil motor, drives slider 10 generally radially across the plane of the surface of disk 2 so that read/write head 8 may access different data tracks on disk 2.

Typically, numerous sliders are fabricated from a single wafer (e.g., an AlTiC wafer) that includes rows of magnetic transducer heads 8 deposited on the wafer surface using semiconductor-type process methods. The wafer, by a series of steps, is divided into individual sliders 10. After this and prior to attaching slider 10 to rigid arm 14 and suspension element 16, slider 10 is cleaned in order to remove any particulate and chemical contaminant (e.g., lubricant) that might present on its surface. During the cleaning processes, each of a plurality of sliders 10 can be positioned in a cavity of a cleaning tray, for example.

Sliders 10 can have a wide variety of sizes, but in one exemplary embodiment, the sliders have side dimension between 700 and 1250 micrometers, with a height of about 200 micrometers. Other particular examples of slider sizes include sliders that are 1235 micrometers by 770 micrometers with a thickness or height of 230 micrometers, sliders that are 1235 micrometers by 700 micrometers with a thickness or height of 180 micrometers, and sliders that are 850 micrometers by 700 micrometers with a thickness or height of 180 micrometers.

Figure 3:
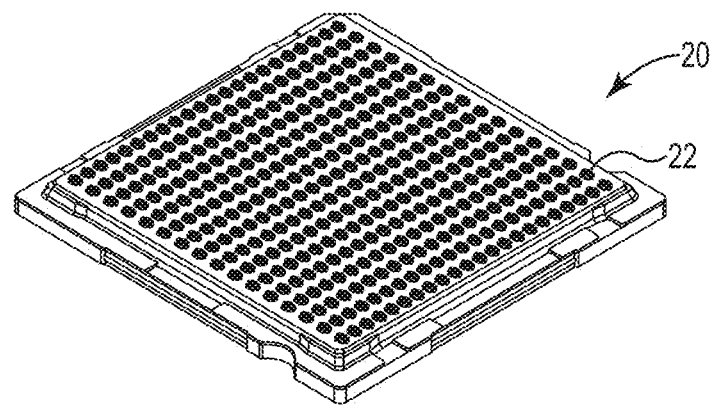
FIG. 3 is a perspective view of a prior art tray having a plurality of openings for holding sliders or other electronic components.

Referring to FIG. 3, an exemplary prior art tray 20 such as the type shown and described in U.S. Pat. No. 9,406,325 is illustrated, which includes a plurality of recesses or cavities 22, each of which includes a length, a width, and a depth configured to retain a rectangular component therein, such as a slider. The cavities are oriented in a plurality of rows and columns, wherein the number and arrangement of rows and columns can be the same, similar, or vary significantly from the illustrated tray. At this point in the processing, each slider has been formed, lapped, and/or otherwise processed so that it has an air bearing surface, rails, and the appropriate elements to read from and write to a data track on a disk. Contamination, such as particulate debris and/or organic or other chemical contamination or films, may be present on slider at this state, and the tray is configured to hold the sliders during one or more processes for cleaning this matter from the slider.

Figure 4:
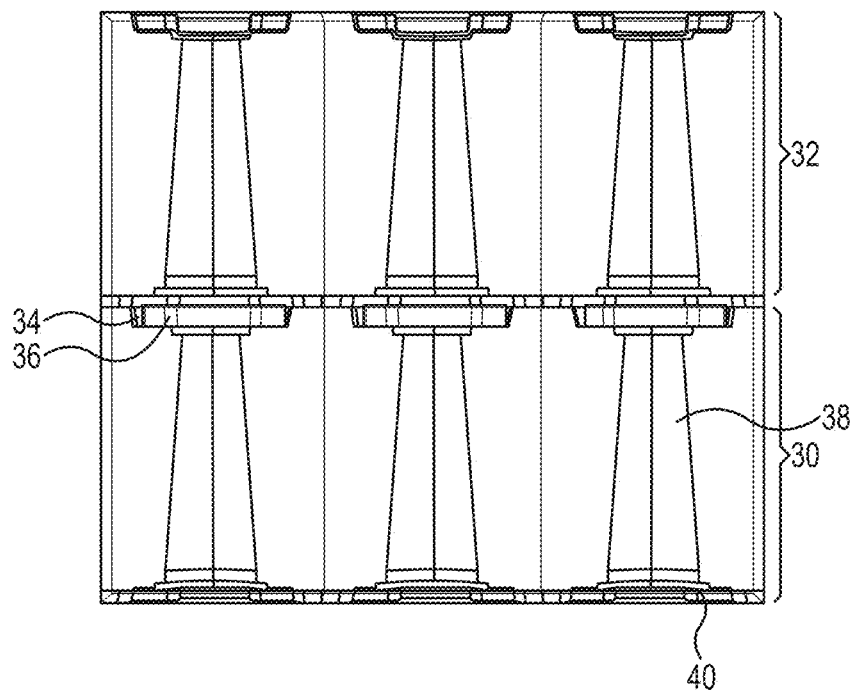
FIG. 4 is a cross-sectional side view of two prior art trays stacked on top of each other, with the lower of the two trays containing sliders.

FIG. 4 illustrates an exemplary stacking of two standard trays 30, 32 that are generally known in the art (e.g., the type described above relative to FIG. 3), wherein the tray 32 is positioned as a cover tray to the base tray 30 in this configuration. As shown, these trays have similar or identical structures, and may include trays that are mirror images of each other. Alternatively, the trays can include different structures from each other. Base tray 30 includes multiple pockets 34 at its top surface, each of which is sized and shaped to hold a single slider 36. A channel 38 extends from each of the pockets 34 and is in fluid communication with the pocket via an aperture (not visible in this Figure). The bottom surface of the base tray 30, which is opposite the top surface of the base tray 30, includes multiple recesses 40 that include an aperture for fluid communication with one of the channels 38. The recesses 40 on the bottom surface align with the pockets 34 on the top surface, thereby facilitating alignment and stacking of multiple trays relative to each other.

Figure 5:
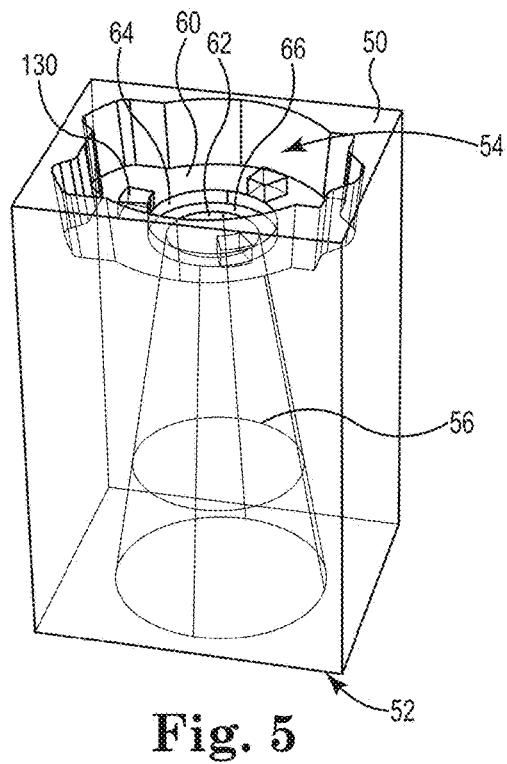
FIG. 5 is a perspective view of a portion of an embodiment of a tray of the invention including a single pocket and fluid channel, wherein the view is shown as opaque for illustrative purposes to show the inner area of the tray.
Figure 6:
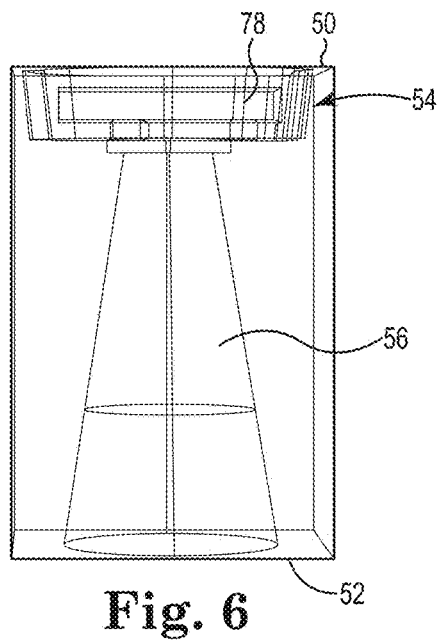
FIG. 6 is a side view of the portion of the tray illustrated in FIG. 5, and further including an exemplary slider in a pocket of the tray.
Figure 7:
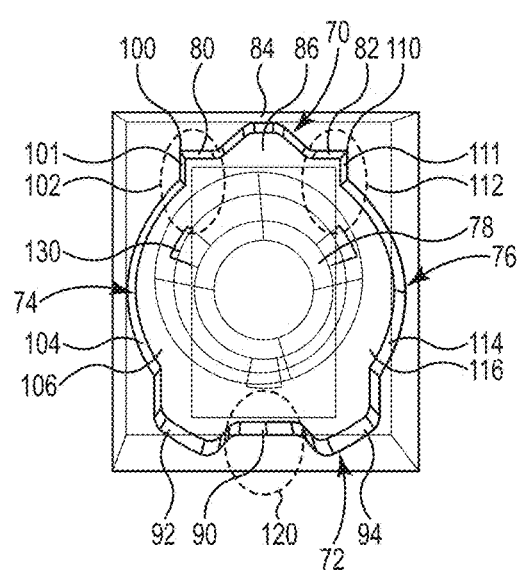
FIG. 7 is a top view of the portion of the tray and slider illustrated in FIG. 6.

FIGS. 5-7 illustrate a portion of a tray for holding a single slider, in accordance with the invention. The tray includes a top tray surface 50, a bottom tray surface 52, a pocket 54 recessed relative to the top tray surface 50, and a channel 56 extending through the thickness of the tray from the pocket 54 to the bottom tray surface. The channel 56 can have a cone-like shape and be tapered as shown, or may have a different shape for its inner walls. The channel 56 provides fluid communication between pocket 54 and the bottom of the tray. Channel 56 may be used to pull a vacuum to better hold the slider in pocket 54 and/or may be used to increase the circulation of cleaning fluid (e.g., washing liquid) to and around the slider.

The trays of the invention include multiple pockets 54 and corresponding channels 56 that can be arranged generally in a pattern of rows and columns, such as is shown relative to the exemplary tray 20 of FIG. 3. This arrangement of pockets will facilitate the placement of multiple sliders for storage and/or cleaning.

With continued reference to FIGS. 5-7, each of the pockets 54 includes a bottom surface 60, through which an aperture 62 extends. The aperture 62 provides for fluid communication between the pocket 54 and the channel 56. A secondary recess 64 can optionally be provided between the bottom surface 60 of the pocket 54 and the channel 56, which provides a surface 66 that extends outwardly from the aperture 62. Surface 66 can be generally parallel to the top tray surface 50 or can extend at an angle between the bottom surface 60 of the pocket and the aperture 62.

The perimeter of each of the pockets 54 is defined by multiple wall segments that extend upwardly from the bottom surface 60 of the pocket 54 to the top surface 50 of the tray. These wall segments are shown most clearly in the top view of a pocket 54 of FIG. 7. In this Figure, the placement of the walls relative to each other is described with terms such as sides, top, and bottom; however, these terms are utilized for ease of description to describe spatial relationships of elements to another in the figures and are therefore not intended to be limiting. Such spatially related terms encompass different orientations of the device in addition to the particular orientations depicted in the figures and described herein. In addition, a representative rectangular slider 78 is shown as positioned within pocket 54 in FIGS. 6 and 7.

Each of the pockets 54 includes a top wall 70, a bottom wall 72, and first and second side walls 74, 76 extending between the top and bottom walls 70, 72. These walls define the perimeter of the pocket, and can extend at an angle that is perpendicular, angled, or curved relative to the top tray surface 50 and/or the bottom surface 60 of the pocket. Embodiments of these walls 70, 72, 74, 76 are described below.

The top wall 70 includes a first portion 80 extending in a generally perpendicular direction from one end of first side wall 74, a second portion 82 extending in a generally perpendicular direction from one end of second side wall 76, and a third portion 84 that extends between the first and second portions 80, 82. The third portion 84 can include one or more curved and/or linear portions that provide for a space 86 between an edge of the slider 78 and the third portion 84. This space 86 can provide an area through which fluid can circulate, for example.

The bottom wall 72 includes a central linear portion 90 that is configured for contact with a portion of an edge of the slider 78, as is shown in FIG. 7. As is also illustrated, bottom wall 72 includes wall portions 92, 94 that extend from opposite sides of the central linear portion 90. Each of the wall portions 92, 94 is configured to be spaced from the corners and edge of the slider 78. In this particular embodiment, the wall portions 92, 94 are provided as "ears" or protrusions that extend outwardly from the slider 78, wherein these wall portions 92, 94 can include curved and/or linear sections.

The side walls 74, 76 are illustrated as mirror images of each other, although it is understood that these walls can instead be differently configured from each other. Relative to the illustrated embodiment, first side wall 74 extends in a generally perpendicular direction from the first portion 80 of top wall 70 to the wall portion 92 of bottom wall 72. The area where the first side wall 74 meets the top wall 70 is shown as a corner 100 that is included in a contact area 102 represented in dashed lines by an oval. A linear wall portion 101 extends from the corner 100 by a distance that corresponds with the amount of wall contact that is desired between the slider 78 and the wall in this contact area 102. A corner of the slider 78 in the pocket 54 is positioned in corner 100 so that it contacts the walls or is slightly spaced from the walls. First side wall 74 further includes a convex portion 104 that extends from the linear wall portion 101 toward the bottom wall 72. The convex portion 104 is spaced from an edge of the slider 78 to create area 106, which can provide an area through which fluid can circulate for example. The convex portion 104 extends to the wall portion 92 of the bottom wall 72, and can further include one or more additional curved and/or linear segments.

The side walls 74, 76 can optionally be configured with one or more channels connecting adjacent pockets that allow for fluid communication between these pockets. In such an embodiment, the walls 74, 76 include one or more openings or apertures and therefore do not comprise solid wall segments along their entire lengths.

Similarly, second side wall 76 extends in a generally perpendicular direction from the second portion 82 of top wall 70 to the wall portion 94 of bottom wall 72. The area where the second side wall 76 meets the top wall 70 is shown as a corner 110 that is included in a contact area 112 represented in dashed lines by an oval. A linear wall portion 111 extends from the corner 110 by a distance that corresponds with the amount of wall contact that is desired between the slider 78 and the wall in this contact area 112. A corner of the slider 78 in the pocket 54 is positioned in corner 110 so that it contacts the walls or is slightly spaced from the walls. Second side wall 76 further includes a convex portion 114 that extends from the linear wall portion 111 toward the bottom wall 72. The convex portion 114 is spaced from an edge of the slider 54 to create an area 116, which can provide an area through which fluid can circulate for example. The convex portion 114 extends to the wall portion 94 of the bottom wall 72, and can further include one or more additional curved and/or linear segments.

With the pocket configuration set out above, one corner of slider 78 is positionable within the corner 100 and an adjacent corner of slider 78 is positionable within the corner 110, thereby generally limiting or constraining the slider from side to side movement in the area of these corners 100, 110. In addition, an edge of slider 78 that is opposite the corners that are constrained in the pocket corners 100, 110 will be adjacent to central linear portion 90 of wall 72 and provide a contact area 120 represented in dashed lines by an oval. Contact area 120, in combination with contact areas 102, 112, will limit or constrain the slider from movement in the up and down direction (i.e., the direction that is perpendicular to side to side movement). Thus, the positioning and configuration of walls 70, 72, 74, 76 define the perimeter of the pocket 54 and are configured to provide three areas of contact with slider 78 when it is positioned within the pocket.

The bottom surface 60 of each of the pockets 54 can further include a plurality of pedestals 130 extending toward the top surface 50 of the tray. As shown, the pedestals 130 are spaced from each other around the outside of the aperture 62, wherein the pedestals 130 can be evenly or unevenly spaced from each other. In the illustrated embodiment, three pedestals 130 are used in order to provide stability to a slider positioned in the pocket; however, it is contemplated that more or less than three pedestals 130 are used. In an embodiment of the invention, three pedestals are used to elevate the slider from the bottom surface 60 of the pocket to provide for a more free flow of fluid around the slider while providing a coplanar landing surface to minimize or prevent the slider from tilting and/or bumping into the walls of the pocket. The height of the pedestals 130 is selected to correspond to the desired distance that a slider will be spaced from the bottom surface 60 of the pocket 54 to facilitate the flow of fluid around the slider body.

The shape, size, and placement of the pedestals 130 illustrated in FIGS. 5-7 are intended to be representative and can vary from that shown. For one example, the pedestals 130 can be spaced at the same or different distances from the aperture 62. For another example, each pedestal 130 can have the same or different sizes from the other pedestals 130 in a particular pocket. For another example, the pedestals 130 can be rectangular in shape, as shown, or can have a different shape. In any case, the quantity, size, shape, and positioning of the pedestals is selectable to facilitate additional fluid flow circulation relative to the slider.

Figure 8:
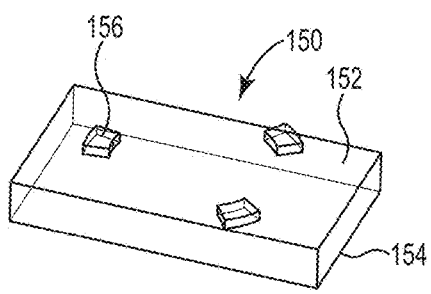
FIG. 8 is a perspective view of an exemplary slider of the invention.

FIG. 8 illustrates an exemplary slider 150 of the invention, which includes a first surface 152 and an opposite surface 154. Multiple pedestals or pads 156 extend from first surface 152 and are provided to space the slider surfaces from the pocket surfaces in a similar manner to the pedestals 130 discussed above. These pads 156 are positioned on the slider 150 in locations that will not negatively affect recording head performance and/or manufacturability. For example, the pads 156 can be placed on the slider surface that is opposite the air bearing surface. It is understood that the pads 156 may provide the desired spacing of the slider from the pocket surface in a case where the bottom surface of the pocket does not include pedestals, or a slider with pads 156 can be used in combination with a pocket surface that includes pedestals. In the latter case, the pads 156 can be positioned to cooperate with pedestals in the pockets so that the pads 156 do not interfere with the pedestals provided in a pocket in which the slider will be positioned.

A slider with pads can include spacing and positioning similar to that discussed above relative to pedestal spacing and positioning. That is, pads can be spaced at the same or different distances from the aperture 62. For another example, each pad can have the same or different sizes from the other pads on a particular slider. For another example, the pads can be rectangular in shape, as shown, or can have a different shape. In any case, the quantity, size, shape, and positioning of the pads is selectable to facilitate additional fluid flow circulation relative to the slider.

Figure 9:
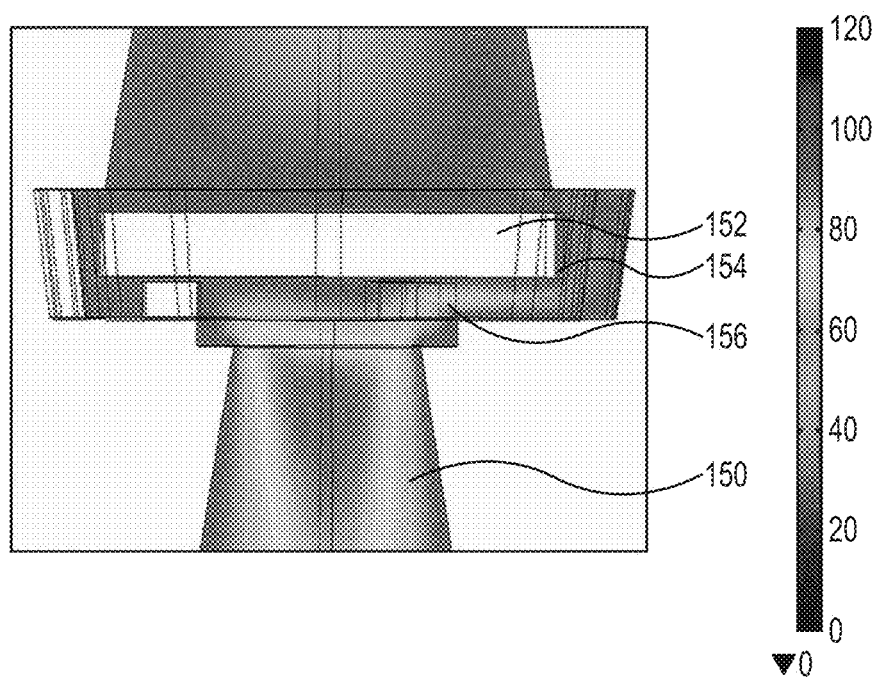
FIG. 9 is a cross sectional view of a model of a portion of a tray of the invention illustrating an exemplary fluid flow around a slider.

FIG. 9 is a cross sectional view of a model of a portion of a tray of the invention illustrating an exemplary fluid flow from a channel 150 relative to a slider 152 positioned in a pocket 154. In this embodiment, multiple pedestals 156 extend upwardly from a bottom surface of pocket 154, thereby elevating the slider 152 above the bottom surface and providing more space for increased fluid flow around the slider 152.

As discussed above, trays of the invention include a plurality of pockets that are recessed relative to a top tray surface, each of which can receive a slider. In an exemplary embodiment, the pockets can have a depth of approximately 200-300 micrometers, although it is understood that the pockets can have a greater or lesser depth, depending on the thickness of the slider to be held by the tray and whether there is an acceptable or desirable thickness of the slider that can extend beyond the top tray surface. The depth of the pocket is therefore coordinated with the height of the slider to be held in the pocket so that the slider is securely retained during the cleansing and/or transportation processes. In some embodiments, the slider is level with the top surface of the tray or even recessed slightly relative to the top surface of the tray.

The bottom surface of each of the trays can include multiple recesses or cavities, each of which is in communication with a channel and a corresponding pocket with an aperture. The recesses in the tray bottom can facilitate stacking of multiple trays having the sliders retained therein. When multiple trays are stacked, the top surface of a first tray will contact the bottom surface of a second tray, the top surface of the second tray will contact the bottom surface of a third tray, and so on. If recesses are provided in the bottom of the trays, these recesses can be configured to accommodate any protrusion of the slider above the top surface of the adjacent tray.

The design and/or selection of pockets and the trays can be coordinated to accommodate the particular sliders to be washed and/or carried by the tray and/or on the particular processing equipment. A common size for cleansing and/or carrier trays is about 2 inches×2 inches (i.e., about 5 cm×5 cm), although larger and smaller trays can be used. The pockets of a particular tray can be arranged in orderly rows and columns, such as an exemplary tray that includes 22 rows and 16 columns of pockets, thus having 352 total pockets. Other embodiments of trays may have more or less pockets.

The trays of the invention may be formed from any suitable material, such as a polymeric material or polymer based composite, due to ease of manufacturing by molding (e.g., injection molding). Exemplary materials that can be used include PEEK (polyether ether ketone), PETE (polyethylene terephthalate), polycarbonate, polyester, fiber-reinforced polymer, or the like.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A tray system for containing multiple electronic components, the tray system comprising:
    a first tray comprising a planar member and a plurality of pockets recessed into an upper surface of the planar member, wherein each of the pockets comprises:
        a bottom planar surface;
        an aperture extending through the bottom planar surface;
        a plurality of wall segments extending from the bottom planar surface of the pocket to the upper surface of the planar member and defining a perimeter of the pocket; and
        a plurality of pedestals extending from the bottom planar surface of the pocket toward the upper surface of the first tray and spaced from each other around the aperture; and
    a supply channel extending from each aperture to a lower surface of the planar member.

2. The tray system of claim 1, further comprising:
    a second tray having a lower surface adjacent to an upper surface of the first tray, wherein the second tray comprises at least one fluid channel extending through its thickness for fluid communication with one of the pockets of the first tray.

3. The tray system of claim 1, wherein each of the pockets comprises multiple pedestals extending from the bottom surface of the pocket toward the upper surface of the first tray, wherein a contact surface of each of the multiple pedestals defines a planar surface on which an electronic component can be positioned.

4. The tray system of claim 3, wherein each of the pockets comprises three pedestals.

5. The tray system of claim 1, wherein the plurality of wall segments comprise two adjacent corners at a first side of the pocket and a flat surface at a second side of the pocket that is opposite the first side.

6. The tray system of claim 5, wherein the plurality of wall segments comprise a portion between each of the corners and the flat surface that comprises a convex curve.

7. The tray system of claim 5, wherein each supply channel is connected to a fluid source that provides pressurized solution for cleaning an electronic component positioned each pocket.

8. The tray system of claim 1, wherein at least one of the multiple electronic components comprises a rectangular perimeter.

9. The tray system of claim 1, wherein the multiple electronic components comprise a plurality of magnetic head sliders.

10. A tray for containing a plurality of electronic components, the tray comprising a planar member and a plurality of pockets recessed into an upper surface of the planar member, wherein each of the pockets comprises:
 a bottom planar surface;
 an aperture extending through the bottom planar surface;
 a supply channel extending from a lower surface of the planar member to the aperture;
 a plurality of wall segments extending from the bottom planar surface of the pocket to the upper surface of the planar member and defining a perimeter of the pocket; and
 a plurality of pedestals extending from the bottom planar surface of the pocket toward the upper surface of the planar member and spaced from each other around the aperture.

11. The tray of claim 10, wherein at least two pair of adjacent segments of the plurality of wall segments meet at a corner.

12. The tray of claim 11, wherein at least one of the plurality of wall segments comprises a linear wall segment.

13. A storage and cleaning tray containing a plurality of electronic components, wherein the tray comprises:
 a planar member and a plurality of pockets recessed into an upper surface of the planar member, wherein each of the pockets comprises:
  a bottom planar surface;
  an aperture extending through the bottom planar surface;
  a supply channel extending from a lower surface of the planar member to the aperture; and
  a plurality of wall segments extending from the bottom planar surface of the pocket to the upper surface of the planar member and defining a perimeter of the pocket; and
 an electronic component positioned within at least one of the pockets, wherein a bottom surface of the electronic component is spaced from the bottom surface of the pocket.

14. The storage and cleaning tray of claim 13, wherein the pocket further comprises a plurality of pedestals extending from the bottom surface of the pocket toward the upper surface of the planar member and spaced from each other around the aperture.

15. The storage and cleaning tray of claim 14, wherein each of the pockets comprises three pedestals extending from the bottom surface of the pocket toward the upper surface of the first tray, wherein a contact surface of each of the three pedestals define a planar surface on which an electronic component can be positioned.

16. The storage and cleaning tray of claim 13, wherein each of the electronic components comprises a plurality of members extending from the bottom surface of the electronic components that contact a bottom surface of one of the pockets.

17. The storage and cleaning tray of claim 13, wherein at least one of the plurality of electronic components comprises a rectangular perimeter.

* * * * *